(12) United States Patent
Saito et al.

(10) Patent No.: US 8,011,644 B2
(45) Date of Patent: Sep. 6, 2011

(54) LIQUID SEALED VIBRATION ISOLATING DEVICE

(75) Inventors: Jun Saito, Fujimino (JP); Masatomo Nishizaka, Fujimino (JP); Nobuo Kubo, Wako (JP); Hiroshi Yanagase, Wako (JP)

(73) Assignees: Yamashita Rubber Kabushiki Kaisha, Fujimino-shi (JP); Honda Motor Co., Ltd., Tokyo (JP)

( * ) Notice: Subject to any disclaimer, the term of this patent is extended or adjusted under 35 U.S.C. 154(b) by 881 days.

(21) Appl. No.: 11/950,462

(22) Filed: Dec. 5, 2007

(65) Prior Publication Data

US 2008/0284075 A1 Nov. 20, 2008

(30) Foreign Application Priority Data

Dec. 5, 2006 (JP) .................................. 2006-328646
Dec. 5, 2006 (JP) .................................. 2006-328647

(51) Int. Cl.
*F16F 5/00* (2006.01)

(52) U.S. Cl. ................................. 267/140.13
(58) Field of Classification Search ............. 267/140.12, 267/140.13, 140.14; 248/636, 562
See application file for complete search history.

(56) References Cited

U.S. PATENT DOCUMENTS

| 6,311,963 | B1 * | 11/2001 | Suzuki et al. | ............ 267/140.13 |
| 7,188,829 | B2 * | 3/2007 | Miyahara | ................. 267/140.13 |

FOREIGN PATENT DOCUMENTS

| DE | 4212190 | 11/1992 |
| DE | 112007002950 | 10/2009 |
| EP | 1120581 | 8/2001 |
| EP | 1995491 | 11/2008 |
| JP | 58072741 A | * 4/1983 |
| JP | 59231238 A | * 12/1984 |
| JP | 61045129 A | * 3/1986 |
| JP | 3-107636 | 5/1991 |
| JP | 03107636 | 5/1991 |
| JP | 2004-316723 | 11/2004 |
| JP | 2004316723 | 11/2004 |
| JP | 2006-064069 | 3/2006 |
| JP | 2006064069 | 3/2006 |
| JP | 2007139024 | 6/2007 |
| WO | 2005100814 | 10/2005 |
| WO | 2008069131 | 6/2008 |

* cited by examiner

*Primary Examiner* — Thomas J Williams
(74) *Attorney, Agent, or Firm* — Rankin, Hill & Clark LLP

(57) ABSTRACT

To block the transmission to a vehicle body side of the vibration due to the cavitation phenomenon occurred in a primary liquid chamber so as to prevent the generation of noises, at the same time, to make the device compact, and to improve the fitting accuracy to obtain the reliable positioning, a first metallic fitting and a second metallic fitting are connected by an insulator. A primary liquid chamber and a secondary liquid chamber formed inwardly are partitioned by a partition member and communicated therebetween by an orifice passage. The partition member is floatingly supported between an extended portion of the insulator and an outer peripheral thick wall portion of a diaphragm, and the tuning is performed to generate the rigid resonance at the predetermined frequency. An outer ring is provided in the outer peripheral thick wall portion so as to be securely fixed by a fixing portion formed by bending an end of an outer cylindrical fitting. The floatingly supporting structure does not become large-sized and complicated since the partition member is simply floatingly supported.

18 Claims, 7 Drawing Sheets

LIQUID SEALED VIBRATION ISOLATING DEVICE

BACKGROUND OF THE INVENTION

1. Field of the Invention

The present invention relates to a liquid sealed vibration isolating device for use in an engine mount or the like for motor vehicles and more particularly, to the device capable of effectively reducing noises created due to a cavitation phenomenon.

2. Description of the Related Art

In the liquid sealed vibration isolating device of this type, negative pressure is developed instantaneously in a primary liquid chamber when the heavy load is applied, so as to cause the cavitation phenomenon that hydraulic liquid is partially vaporized, and then the noise is generated. In view of this, there are proposed various kinds of devices for reducing transmission of the noise. The vibration generated when bubbles due to the cavitation phenomenon burst is transmitted from a partition member to a second metallic fitting and then from the second metallic fitting to a vehicle body side, so that it is perceived as the noise.

Therefore, in order to block such noise, there is known the art that an elastic body is interposed between a fitting bracket to the vehicle body and the second metallic fitting in such a manner that the whole of liquid sealed structure is floatingly supported on the vehicle body to block the transmission of the vibration from the inside of the primary liquid chamber to the vehicle body (as an example, see a patent reference 1). There is also known the structure that floatingly supports the partition member though an elastic body (as an example, see patent references 2 and 3).

Patent reference 1: Japanese patent laid-open publication No. 2006-64069.
Patent reference 2: Japanese patent laid-open publication No. 2004-316723.
Patent reference 3: Japanese patent laid-open publication No. H03-107636.

In the case where the whole of liquid sealed structure is floatingly supported on the vehicle body in such a manner as in the above mentioned prior art, the vibration is not transmitted to the vehicle body even if the cavitation phenomenon occurs in the primary liquid chamber, so that it is possible to block the generation of the perceivable noise. However, since the whole of liquid sealed structure is subject to lateral movement, etc. due to deformation of the elastic body interposed in relation to the vehicle body fitting (bracket), the support of the whole of the liquid sealed vibration isolating device becomes unstable. Moreover, since the device becomes large and component parts are increased so as to incur the increase in cost, the improvement in these respects is required.

On the other hand, in the case where only the partition member is floatingly supported without floatingly supporting the whole of the device as above, the partition member is held between a portion of an insulator and an outer peripheral portion of a diaphragm, so that since a floatingly supported portion undergoes a load in the direction of compression, the value of spring is increased so as to decrease the degree of freedom of the tuning with respect to the rigid resonance of the floatingly supported partition member.

Moreover, when strong force is applied to the diaphragm in the case of caulking the end of the second metallic fitting, etc., the outer peripheral portion of the diaphragm is deformed much by compression so as to develop a change in the value of spring for floatingly supporting the partition member. Therefore, it is required to prevent the development of remarkable change in performance at the time of assembling. It is also required not to affect the sealing property.

Further, the above mentioned patent reference 2 has no structure for floatingly supporting the partition member by the outer periphery of a diaphragm, and the metallic fitting for caulking and fixing a ring integrally formed with the outer periphery of the diaphragm is united through a thin elastic layer with an outer cylinder portion which corresponds to the second metallic fitting. Therefore, the partition member is not possible to generate and is not designed to generate the rigid resonance for effectively blocking for example the frequencies of about 800~4000 Hz as a practically considerable range (hereinafter, referred to as noise frequency range) of the frequency which is perceived as the noise, within a frequency range of vibration generated due to the cavitation phenomenon. Accordingly, there is required the structure capable of mounting the second metallic fitting securely, capable of effectively preventing the noise created due to the cavitation phenomenon, moreover, capable of making the device compact, further, capable of increasing the degree of freedom of the tuning, and capable of preventing the change in the value of spring when in assembling.

Further, since an end of the ring inserted in the outer periphery of the diaphragm is in direct contact with the partition member so that the other end of the ring presses the partition member strongly when the other end is assembled and fixed by bending the metallic fitting, there is a possibility that the elastic body for floatingly supporting the partition member is compressed and deformed to a great extent so as to bring about a change in value of spring. Thus, since there is difficulty in the fitting operation of the diaphragm at the time of assembling, it is required to make the assembling operation easy.

Further, in the example of the patent reference 3, a seal portion formed by an outer peripheral portion of a diaphragm is subject to elastic deformation, so that an assembling operation for fixing the diaphragm while maintaining a proper sealing property becomes difficult. Therefore, it is required that the assembling operation can be easily carried out while maintaining a high sealing property. The present invention is made to materialize such requirements.

SUMMARY OF THE INVENTION

To solve the above mentioned problem, a liquid sealed vibration isolating device according to a first aspect of the present invention comprises a first metallic fitting to be mounted on one of mounting counterparts, a second cylindrical metallic fitting to be mounted on the other of the mounting counterparts, an insulator for connecting in a vibration isolating state between the first and the second metallic fittings, a primary liquid chamber using the insulator as a part of the wall thereof and being filled with a hydraulic liquid, a secondary liquid chamber being partitioned from the primary liquid chamber by a partition member and having at least a portion of a wall formed by a diaphragm, an orifice passage being formed in the partition member to communicate between the primary liquid chamber and the secondary liquid chamber, and a portion of the second metallic fitting forming an outer metallic cylinder which is united with the periphery of the insulator, wherein the partition member is floatingly supported between the insulator and an outer peripheral thick wall portion of the diaphragm while an elastic body is interposed between the second metallic fitting and the partition member, so as to block the transmission of vibration from the partition member to the second metallic fitting, the outer peripheral thick wall portion of the diaphragm is provided with a rigid metallic diaphragm support united therewith and an elastic supporting portion for floatingly supporting the partition member, the metallic diaphragm support is fixed by the second metallic fitting in the directly contacted relationship between these metallic members and arranged away from the partition member, and the elastic support portion is located inside of the metallic diaphragm support to floatingly support the partition member.

According to a second aspect of the present invention, the metallic diaphragm support comprises a rigid ring which separates the outer peripheral thick wall portion of the diaphragm into the elastic support portion on the inside and a seal portion on the outside.

According to a third aspect of the present invention, dual rings which are spaced apart inwardly and outwardly are united with the outer peripheral thick wall portion, the inward ring is located in the elastic support portion to support the partition member, and the outward ring forms the metallic diaphragm support.

According to a fourth aspect of the present invention, the metallic diaphragm support is formed by a substantially L-shaped member in cross section which is united with a peripheral portion and a bottom portion of the outer peripheral thick wall portion.

According to a fifth aspect of the present invention, the second metallic fitting comprises a metallic connector being united with the peripheral portion of the insulator and an extended portion being extended from a portion of the metallic diaphragm support, the outer peripheral thick wall portion being integrally provided with a main body portion for supporting the partition member and an elastic cylindrical portion being extended continuously from the main body portion to a lateral side of the metallic connector, the elastic cylindrical portion is fitted on an outside of the metallic connector to form a seal portion between an inside wall of the elastic cylindrical portion and an outer wall of the metallic connector, a portion of the metallic diaphragm support is extended to cover an outside of the elastic cylindrical portion and to form the extended portion, and a tip end of the extended portion is bent outwardly and overlapped with a portion of the metallic connector which is projected laterally from the insulator, so as to be fixedly combined by direct contact between these metallic members.

According to a sixth aspect of the present invention, a clearance is provided between an outer peripheral portion of the partition member and an elastic body located around the outer peripheral portion.

A liquid sealed vibration isolating device according to a seventh aspect of the present invention comprises a first metallic fitting to be mounted on one of mounting counterparts, a second cylindrical metallic fitting to be mounted on the other of the mounting counterparts, an insulator for connecting in a vibration isolating state between the first and the second metallic fittings, a primary liquid chamber using the insulator as a part of the wall thereof and being filled with a hydraulic liquid, a secondary liquid chamber being partitioned from the primary liquid chamber by a partition member and having at least a portion of a wall formed by a diaphragm, an orifice passage being formed in the partition member to communicate between the primary liquid chamber and the secondary liquid chamber, and the partition member being held between the insulator and an outer peripheral portion of the diaphragm, wherein the insulator is connected to the outer peripheral portion of the diaphragm while the connected portion between the insulator and the diaphragm is supported by deformation in the direction of shear of the insulator, so as to floatingly support the partition member such that the partition member rigidly resonates.

According to an eighth aspect of the present invention, the insulator is integrally provided with a metallic connector which is supported by the deformation in the direction of shear of the insulator, a portion of the metallic connector is extended from the insulator, and a portion of a metallic fitting ring which is united with the outer peripheral portion of the diaphragm is extended, wherein the extended portions of the metallic connector and of the fitting ring each are combined in the directly contacted relationship between metals in a position outwardly away from the outer peripheral portion.

According to a ninth aspect of the present invention, the fitting ring is projected outwardly of the outer peripheral portion of the diaphragm to be combined with the metallic connector in the directly contacted relationship between metals and to form a seal surface to which an elastic body located around the partition member adheres.

According to a tenth aspect of the present invention, the fitting ring is provided with a ring portion of a substantially L-shaped cross section and a flange portion, the ring portion is adapted to support in a state of a ring shape the outer peripheral portion of the diaphragm while the flange portion abuts on and supports the partition member and is projected outwardly of the outer peripheral portion of the diaphragm to be combined with the metallic connector.

According to an eleventh aspect of the present invention, a clearance is provided between the outer peripheral portion of the partition member and the insulator located around the outer peripheral portion.

According to a twelfth aspect of the present invention, a vibration system comprising mass of the partition member and springs of the insulator and the outer peripheral portion of the diaphragm for floatingly supporting the partition member, mass comprising the hydraulic liquid in the secondary liquid chamber and the fitting ring is added to the mass of the partition member.

According to the invention as defined in the first aspect, since the partition member is floatingly supported between the insulator and the outer peripheral thick wall portion of the diaphragm, it is possible to reliably generate the rigid resonance by the partition member. Then, since the elastic body is interposed between the second metallic fitting and the partition member, the transmission of vibration from the partition member to the second metallic fitting can be blocked by this elastic body interposed layer in cooperation with the rigid resonance by the partition member. Therefore, even if the vibration due to the cavitation phenomenon in the primary liquid chamber is generated, the vibration is not transmitted from the second metallic fitting to the vehicle body, so that the generation of noise perceivable on the side of vehicle body can be prevented. Further, since the elastic supporting portion is provided on the outer peripheral thick wall portion of the diaphragm and the rigid metallic diaphragm support is united with the outer peripheral thick wall portion, the outer peripheral thick wall portion of the diaphragm can be securely supported through the metallic diaphragm support by the second metallic fitting so as to ensure the reliable support of the partition member by the elastic support portion, when the metallic diaphragm support is fixed by the second metallic fitting in the directly contacted relationship between these metallic members. Also, the device can be small-sized and the component parts can be similar to the conventional ones, thereby making it possible to save the cost. Moreover, when the second metallic fitting is fixedly mounted on the vehicle body side, the device can be steadily supported without lateral movement, etc.

Further, since the metallic diaphragm support is arranged away from the partition member, in the case of being fixed by caulking or the like by the second metallic fitting, the strong force applied in this fixing operation is not transmitted from the metallic diaphragm support to the partition member. Therefore, the change in value of spring at the time of assembling operation can be prevented, so that it is possible to make the assembling operation easy thereby improving the working efficiency. Moreover, since the outer peripheral thick wall portion of the diaphragm provided with the seal portion is fixed rigidly on the second metallic fitting, the elastic deformation beyond necessity of the seal portion by the force applied at the time of fixing can be prevented so as to enhance the sealing reliability, whereby the proper sealing property can be maintained while blocking the transmission of vibration by the partition member.

According to the invention as defined in the second aspect, since the seal portion and the elastic support portion are separated inwardly and outwardly by the metallic diaphragm support comprised of the rigid ring, the seal portion to be rigidly fixed is not influenced by the movement of the elastic support portion. Also, since the seal portion is not compressed between the metallic diaphragm support and the partition member when the metallic diaphragm support is fixed, the elastic deformation of the seal portion at the time of assembling is prevented so as to improve the sealing reliability. Therefore, the proper sealing property is maintained while blocking the transmission of vibration by the partition member. In addition, the elastic support portion is separated from the seal portion by the metallic diaphragm support, so that the secure fixing of the seal portion does not exert an influence upon the value of spring of the elastic support portion.

According to the invention as defined in the third aspect, since the inwardly and outwardly spaced dual rings are united with the outer peripheral thick wall portion, the inward ring can securely support the partition member as a reinforcement of the elastic support portion while the outward ring as the metallic diaphragm support can be fixed by the second metallic fitting. Thus, the elastic support portion and the seal portion each can be reinforced by the dual rings united with the outer peripheral thick wall portion, so as to share each function assuredly.

According to the invention as defined in the fourth aspect, the metallic diaphragm support is formed into an L-shaped ring one portion of which is united with the peripheral portion of the outer peripheral thick wall portion to be firmly fixed by the second metallic fitting and the other portion of which is united with the bottom portion of the outer peripheral thick wall portion to support the elastic support portion. Thus, the rigid support of the outer peripheral thick wall portion can be performed by a single member.

According to the invention as defined in the fifth aspect, a portion of the metallic diaphragm support forms the extended portion to function as a portion of the second metallic fitting so that the caulking operation is easily carried out between the extended portion and the metallic connector on the insulator side on a laterally outward side of the insulator. Also, since a portion of the outer peripheral thick wall portion of the diaphragm is extended to form the elastic cylindrical portion while the seal portion is formed between the elastic cylindrical portion and the metallic connector, the seal portion is located remote enough from the elastic support portion so as to improve the sealing performance.

According to the invention as defined in the sixth aspect, since the clearance is provided between the peripheral portion of the partition member and an elastic body located around the peripheral portion thereby allowing the partition member to be easily vibrated, the rigid resonance of the partition member can be reliably developed.

According to the invention as defined in the seventh aspect, since the diaphragm supporting the partition member is supported by the shear deformation of the insulator whereby the partition member and the diaphragm are floatingly supported by the insulator such that the partition member rigidly resonates, the vibration transmitted from the primary liquid chamber through the partition member to the second metallic fitting can be reduced by the rigid resonance of the partition member and the insulator located between the partition member and the second metallic fitting. Therefore, even if the vibration due to the cavitation phenomenon in the primary liquid chamber is generated, the vibration is not transmitted through the partition member from the second metallic fitting to the vehicle body, so that the generation of noise perceivable on the side of vehicle body can be prevented.

Moreover, different from the prior art that the whole of the device is floatingly supported, since only the partition member and the diaphragm are floatingly supported and only the comparatively small modification in structure is required, it is possible to make the device compact and to save the cost. Also, since the second metallic fitting is fixedly mounted on the vehicle body side, the device can be steadily supported without lateral movement, etc. Further, since the insulator supports the connected portion to the diaphragm in the direction of shear, the partition member is easy to be vibrated, and the value of spring of the floating support portion can be widely changed thereby making it possible to increase the degree of freedom of the tuning with respect to the rigid resonance of the partition member.

According to the invention as defined in the eighth aspect, since the insulator is integrally provided with the metallic connector which is supported by the deformation in the direction of shear of the insulator, and a portion of the metallic connector is combined with a portion of the metallic fitting ring which is united with the outer peripheral portion of the diaphragm, in the directly contacted relationship between metals in a position outwardly away from the outer peripheral portion, with this connection the outer peripheral portion of the diaphragm which floatingly supports the partition member is not compressed by far, so as not to develop the change in the value of spring, whereby the change in performance at the time of assembling can be prevented.

According to the invention as defined in the ninth aspect, since the fitting ring is projected outwardly of the outer peripheral portion of the diaphragm to be combined with the metallic connector in the directly contacted relationship between metals and the projected portion functions as the seal surface to which an elastic body located around the partition member adheres, it is possible to make the seal surface stable and to maintain the proper sealing performance.

According to the invention as defined in the tenth aspect, since the fitting ring is formed into substantially L-shape in cross section and provided with the ring portion and the flange portion, the ring portion can support in a state of a ring shape the outer peripheral portion of the diaphragm. Also, since the flange portion abuts on and supports the partition member and forms the connecting portion between the seal surface and the metallic connector, it is possible to form the seal portion and the connection fixing portion in a single member while the seal portion and the outer peripheral portion of the diaphragm can be reinforced at the same time.

According to the invention as defined in the eleventh aspect, since the clearance is provided between the outer peripheral portion of the partition member and the insulator located around the outer peripheral portion, the rigid resonance of the partition member can be reliably developed.

According to the invention as defined in the twelfth aspect, since the mass comprising the hydraulic liquid in the secondary liquid chamber and the fitting ring is added to the mass of the rigid resonance, it is possible to decrease the frequency of the rigid resonance by the increase of the mass thereby to easily adjust the resonance frequency.

DETAILED DESCRIPTION OF THE EMBODIMENTS

Figure 1:
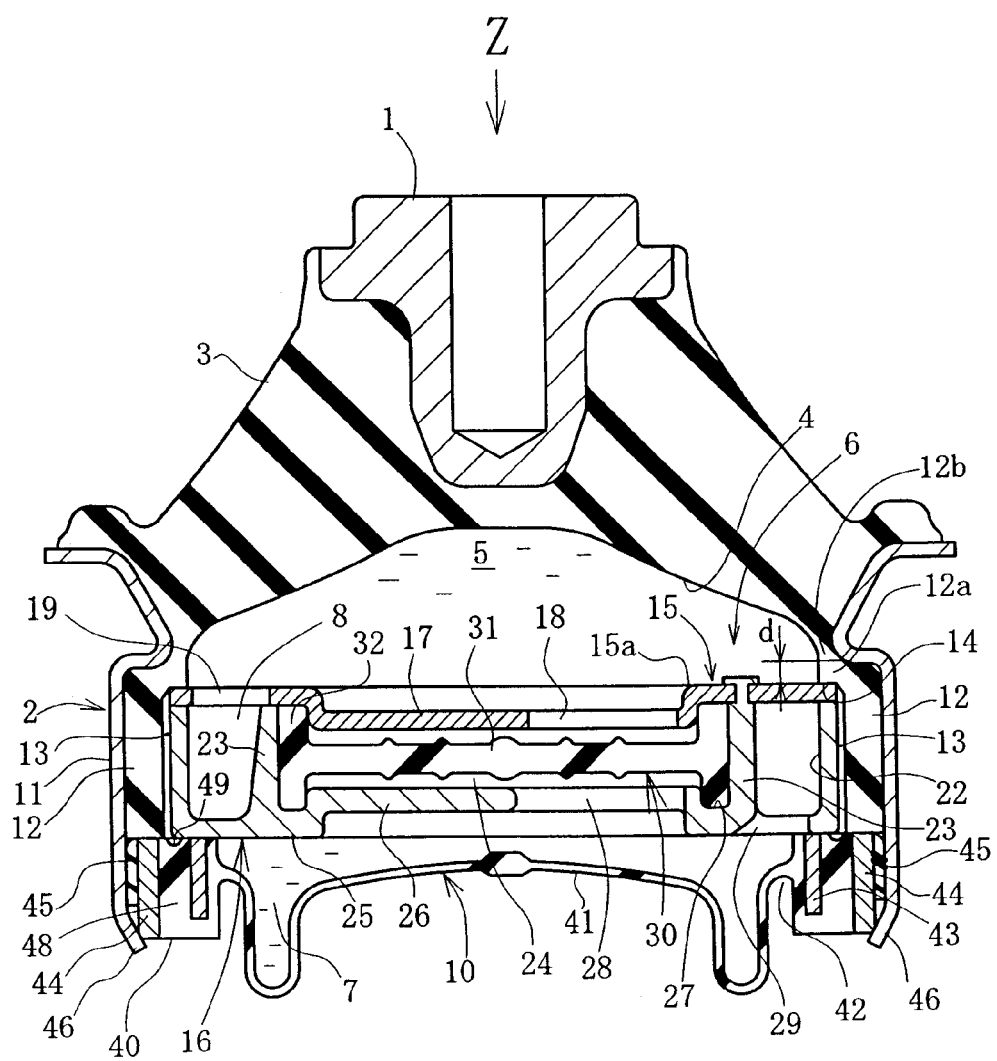
FIG. 1 is a vertical cross sectional view of an engine mount according to the first embodiment of the present invention.
Figure 2:
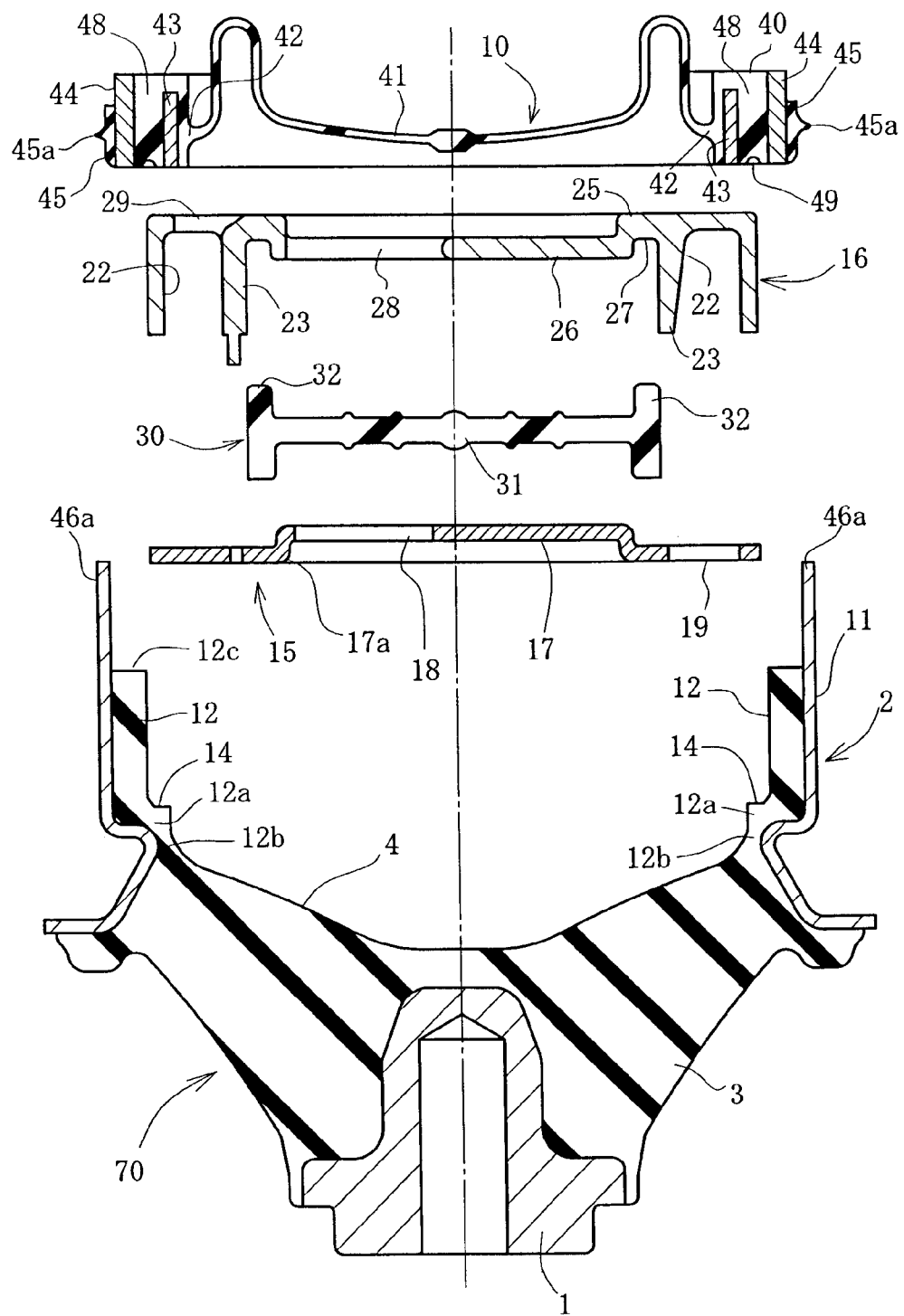
FIG. 2 is an exploded view of the above engine mount.

Hereinafter, the first embodiment embodied in an engine mount for motor vehicles will be explained with reference to the accompanying drawings. FIG. 1 is a longitudinal cross section of an engine mount. FIG. 2 is an exploded view of each component. FIG. 1 also is a cross section cut in the inputting direction Z of vibration. In the following explanation, each of directions such as up and down, right and left, or the like is expressed based on an illustrated state in FIG. 1.

In these drawings, this engine mount comprises a first metallic fitting 1 to be mounted on the side of an engine (not shown) of the vibration source, a second metallic fitting 2 forming a vehicle body side fitting to be mounted on a vehicle body, i.e., on the vibration receiving side, and an insulator 3 adapted to connect these two members. The insulator 3 is formed by a known vibration isolating elastic member such as rubber or the like and is an elastic body functioning as a main vibration isolating member with respect to the vibration. The vibration inputted to the first metallic fitting 1 in the direction of Z is absorbed first by the elastic deformation of the insulator 3.

The insulator 3 is formed in the shape of substantially truncated conical trapezoid in cross section and provided with a dome portion 4 on the inside thereof. A recessed portion which is opened downwardly in the drawing is formed by a dome portion 4 and forms a primary liquid chamber 5 which is filled with an incompressible hydraulic liquid.

The primary liquid chamber 5 is separated from a secondary liquid chamber 7 by a partition member 6 and is communicated with the secondary liquid chamber 7 by an orifice passage 8 which is formed in the shape of an arc when viewed in the direction of Z. The orifice passage 8 is configured to resonate with the vibration of low frequencies such as a shake vibration of about 10~11 Hz, etc. The secondary liquid chamber 7 is formed between a diaphragm 10 and the partition member 6, and a portion of a wall thereof is formed by the diaphragm 10.

The second metallic fitting 2 is provided with an outer cylindrical metallic fitting 11 of circular cylindrical shape. The outer cylindrical metallic fitting 11 is securely mounted, as the need arises, through a cylindrical holder or bracket (not shown) on the vehicle body side. The second metallic fitting 2 includes the outer cylindrical metallic fitting 11 and the holder or bracket which is provided as the need arises and which is another member to be mounted on the vehicle body side. The outer cylindrical metallic fitting 11 forms a portion of the vehicle body side mounting member 2 and functions as a second metallic fitting.

As shown in FIG. 2, an inside of the outer cylindrical metallic fitting 11 is united with an extended portion 12 of the insulator 3. The extended portion 12 is extended downwardly to enclose an outer periphery of the partition member 6 and covers integrally an inner wall of the outer cylindrical metallic fitting 11. A clearance 13 is formed between the extended portion 12 and the outer periphery of the partition member 6 (see FIG. 1). A step 14 of thick wall is formed on an upper end of the extended portion 12 facing the primary liquid chamber 5, so as to position an upper wall side of the outer peripheral end of the partition member 6.

The partition member 6 is a hollow frame-shaped body and comprises an upper plate 15 and a lower holder 16 which are separated upwardly and downwardly. The upper plate 15 and the lower holder 16 each have rigidity and are formed of proper rigid materials such as light metal, hard resin, etc. The upper plate 15 is formed in the shape of a disk and is lowered a step on the central side thereof to form a central step portion 17 in which an upper central opening 18 communicating with the primary liquid chamber 5 is formed. An upwardly opened arc-shaped groove 22 is provided on an outer periphery of the lower holder 16 to form the orifice passage 8. An upwardly opened central recess 24 is formed on a central side with respect to an annular partition wall 23 forming an inner wall of the groove 22.

A bottom portion 25 is heightened a step on the central side thereof in a state shown in FIG. 1 to form a step portion 26. Adjacent to this step portion 26 and on an outer peripheral side thereof there is provided an annular groove 27. Also, in a central area of the bottom portion 25 there is formed a lower central opening 28 which is in communication with the secondary liquid chamber 7.

An elastic diaphragm 30 is housed in an inward space of the annular partition wall 23 of the partition member 6. The elastic diaphragm 30 is formed of a proper elastic material such as rubber or the like to constitute a member for absorbing the internal pressure fluctuation of the primary liquid chamber 5 and is integrally provided with a central thin wall portion 31 and a fixing portion 32.

The central thin wall portion 31 is accommodated between the central step portion 17 and the step portion 26 provided on the bottom portion 25 and is elastically deformed by the internal pressure fluctuation of the primary liquid chamber 5 in such a manner that the elastic deformation is performed by the liquid pressure of the hydraulic liquid passing in and out through the upper central opening 18 and the lower central opening 28. The fixing portion 32 is a thick rigid annular wall formed on the peripheral side of the central thin wall portion 31, and an upper portion of the fixing portion 32 is positioned by a step portion 15a located on an outer periphery of the central step portion 17 of the upper plate 15 while a lower portion thereof is positioned by being fitted into the annular groove 27, so that it functions as a restraint portion to be fixed by being held between the upper plate 15 and the lower holder 16 from the upper and lower sides so as to form an annular support for the central thin wall portion 31.

With this structure, the central thin wall portion 31 partitions the inward space of the annular partition wall 23 of the partition member 6 to cut off the communication through the upper central opening 18 and the lower central opening 28 between the primary liquid chamber 5 and the secondary liquid chamber 7. Accordingly, the hydraulic liquid contained between the central thin wall portion 31 and the central step portion 17 is in communication through the upper central opening 18 with the primary liquid chamber 5 so as to flow into and out of the primary liquid chamber 5 through the upper central opening 18 by the elastic deformation of the central thin wall portion 31. Similarly, the hydraulic liquid contained between the central thin wall portion 31 and the step portion 26 flows into and out of the secondary liquid chamber 7 through the lower central opening 28 by the elastic deformation of the central thin wall portion 31.

The reference character 19 denotes an opening of the orifice passage 8 formed in the upper plate 15 to communicate with the primary liquid chamber 5. The reference character 29 denotes an opening formed in the bottom wall of the arc-shaped groove 22 to communicate with the secondary liquid chamber 7.

An outer periphery of the bottom portion 25 of the lower holder 16 is supported by an outer peripheral thick wall portion 40 of the diaphragm 10. The outer peripheral thick wall portion 40 is a comparatively rigid annular wall which surrounds an outer periphery of a thin main body portion 41 functioning as the diaphragm 10 and is integrally formed with the main body portion 41 so as to support the main body portion 41.

An inward ring 43 is inserted into the outer peripheral thick wall portion 40 in the vicinity of the main body portion 42. The inward ring 43 is formed into an annular shape, and only the upper end wall thereof is in direct contact between rigid members with the bottom portion 25 of the lower holder 16 to ensure the steady support of the lower holder 16. An outer periphery of the outer peripheral thick wall portion 40 is united with an outward ring 44 by adhesion or the like. The inward ring 43 and the outward ring 44 constitute dual rings arranged spaced apart inwardly and outwardly.

The outward ring 44 which corresponds to a metallic diaphragm support in the present invention functions as a member for fixedly securing the diaphragm 10 to the outer cylindrical metallic fitting 11 and is a metallic ring which is thicker than and higher in rigidity than the inward ring 43. The upper end wall of the outward ring 44 abuts on the lower end wall of the extended portion 12. A seal portion 45 which is united with the outer periphery of the outward ring 44 is protruded outwardly to adhere close to and seal the lower inside wall of the outer cylindrical metallic fitting 11. Namely, the outer peripheral thick wall portion 40 and the seal portion 45 are definitely separated from each other by the outward ring 44. The lower end surface of the outward ring 44 is exposed so as to be fixed by a fixing portion 46 formed by bending the lower end of the outer cylindrical metallic fitting 11 inwardly.

The inward ring 43 and the outward ring 44 are separated apart inwardly and outwardly by the elastic body of the outer peripheral thick wall portion 40 to keep such an enough space and elastic body intervening amount that the vibration transmitted from the lower holder 16 to the inward ring 43 is blocked so as not to be transmitted to the outward ring 44. The outer thick wall portion 40 is formed with the seal portion 45 outside of the outward ring 44 and with an elastic support portion 48 inside of the outward ring 44. The outward ring 44 also functions as a rigid support member for the seal portion 45.

The upper end wall of the outward ring 44 abuts only on the lower end wall of the extended portion 12 and is separated from the lower holder 16. This separation is assuredly performed by having the inner periphery of the outward ring 44 located more outwardly than the clearance 13. The outer periphery of the extended portion 12 is protruded radially outwardly by the seal portion 45 from the outer periphery of the outward ring 44.

The upper end of the outer periphery of the partition member 6 is supported by the step 14 of the extended portion 12 so as to be supported by the shear and the compressive deformation in the vicinity of the step 14. Thus, the partition member 6 is floatingly supported by the extended portion 12 of the insulator 3 and the outer peripheral thick wall portion 40, so that the partition member 6 is supported by two rubber springs comprising the extended portion 12 and the outer peripheral thick wall portion 40. The value of spring differs according to a material or volume of the rubber spring and is able to be adjusted by the thickness.

In this embodiment, when using the thickness of the outward ring 44 as the reference, the thickness of the outer peripheral thick wall portion 40 is about 3~5 times and preferably, about 3 times, the thickness between the outward ring 44 and the inward ring 43 is about 1.5~2 times, and the inward ring 43 is about a half in thickness of the outward ring 44. The outer peripheral side portion located outwardly of the outward ring 44 and the inner peripheral side portion located inwardly of the inward ring 43 are thinner than the inward ring 43, respectively.

Also, the extended portion 12 is about 3~4 times and preferably, about 3 times as thick as the outer cylindrical metallic fitting 11. The thickness "d" of the elastic support portion $12a$ which is an elastic body layer from the step 14 to a narrow portion $12b$ which is located above the step 14 and narrowed by bending the outer cylindrical metallic fitting 11 radially inwardly is about 2~4 times as thick as the outer cylindrical metallic fitting 11.

In the vibration system comprising the partition member 6 and each spring of the elastic support portion $12a$ floatingly supporting the partition member, and of the elastic support portion 48 of the outer peripheral thick wall portion 40, since a kind of dynamic damper that the partition member 6 functions as a mass is established, the resonance frequency is tuned by adjusting this mass and the value of spring of the support springs in such a state that the resonance peak becomes lower than the frequency range (noise frequency range) which is perceived as the noise, within the frequency range of vibration created due to the cavitation phenomenon.

When the resonance frequency is tuned in such a manner as mentioned above, the partition member 6 and the diaphragm 10 are rigidly resonated in the natural frequency determined by each of the springs of the elastic support portion $12a$ of the extended portion 12 and of the elastic support portion 48 of the outer peripheral thick wall portion 40 and by the mass of the partition member 6, so that in a higher frequency range (concretely, a frequency range exceeding substantially the square root of 2 times of a natural value frequency constituting a peak frequency of the rigid resonance) after the rigid resonance, the vibration of rigid body decreases with increasing in frequency. Therefore, the vibration of the rigid body due to the vibration created in the liquid chamber decreases so as to have the transmission of vibration from the rigid body to the outside decreased.

Namely, since the higher vibration than the frequency of the rigid resonance is blocked the transmission by the rigid body, this frequency range is referred to as the vibration block range. However, the term "block" in the present invention is not used in the strict sense of the word but includes "decrease", so that "vibration block range" means the range decreasing the transmission vibration in comparison with the inputted vibration and means the frequency range not only that the transmission is blocked but also that the transmission is decreased.

Accordingly, when the noise frequency range is controlled to be superimposed over the vibration block range, the vibration of noises generated in the primary liquid chamber 5 can be blocked the transmission from the partition member 6 of rigid body through the outer cylindrical metallic fitting 11 to the vehicle body side. Concretely, the tuning is performed such that the peak frequency of rigid resonance is developed at a lower frequency than the noise frequency range.

In this embodiment, the noise frequency range is set to correspond to the frequency range of vibration due to the cavitation phenomenon occurred in the primary liquid chamber 5, and the tuning is performed such that the frequency lower than this frequency range is at a peak of rigid resonance, whereby the vibration block range is superimposed over the noise frequency range. Concretely, although the frequency range of vibration itself generated due to the cavitation phenomenon is wide and difficult to be identified, given that it is 800~4000 Hz, it is possible to superimpose the vibration block range over the frequency range of vibration due to the cavitation phenomenon by setting the peak frequency of rigid resonance at about 600 Hz.

When being tuned in the above mentioned manner, the frequency within the vibration block range of the frequencies due to the cavitation phenomenon occurred in the primary liquid chamber 5 is blocked the transmission of vibration from the partition member 6 to the outer cylindrical metallic fitting 11. Therefore, since this vibration is blocked the transmission to the vehicle body side even if the cavitation phenomenon is occurred in the primary liquid chamber 5, the noise is not perceivable on the vehicle body side. Therefore, it is hard to sense in a bodily sensation the noise due to the cavitation phenomenon so that the noise due to the cavitation phenomenon may be neglected. Also, since the vibration of the partition member 6 is restrained in the vibration block range, and besides, the value of spring of the support springs for floatingly supporting the partition member 6 is greater by far than the value of spring of the central thin wall portion 31, the decline in damping is stopped while preventing the internal pressure from being decreased beyond necessity.

In the case of assembling this engine mount, as shown in FIG. 2, at first, the sub-assembled body 80 that the first metallic fitting 1, the outer cylindrical metallic fitting 11 and the insulator 3 are united together is made. Then, turning the sub-assembled body upside down from the state in FIG. 1, the partition member 6 is fitted into the inside of the extended portion 12 so as to be positioned by the step 14. Next, the outer peripheral thick wall portion 40 of the diaphragm 10 is press-fitted into the inside of the outer cylindrical metallic fitting 11 to abut on the outer periphery of the bottom portion 25 of the partition member 6. Then, a tip end 46a of the outer cylindrical metallic fitting 11 which extends straight before bending is bent inwardly to function as the fixing portion 46, thereby to have the end of the outward ring 44 pressed against and fixed on the partition member 6, so that the whole thereof is assembled into a unit. In this way, when placing each of component parts one upon another in order and forming the fixing portion 46 of the outer cylindrical metallic fitting 11, the whole can be united and easily assembled.

As apparently shown in FIG. 2, a seal lip 45a is formed integral with the seal portion 45 in a radially outwardly projecting state. Therefore, when being press-fitted into the inner peripheral wall of the outer cylindrical metallic fitting 11 in the case of assembling, the outer peripheral portion of the seal portion 45 is crushed by the inner peripheral wall of the outer cylindrical metallic fitting 11 to adhere closely to the inner peripheral wall of the outer cylindrical metallic fitting 11 so as to form the final seal portion between the seal portion 45 and the inner peripheral wall of the outer cylindrical metallic fitting 11. The final seal portion is a place forming a final seal against a leak of the hydraulic liquid.

Further, an annular groove 49 is provided concentric with the inward ring 43 and the outward ring 44 on the surface abutting on the bottom portion 25 of the elastic support portion 48 which functions as the elastic support portion on the side of the outer peripheral thick wall portion 40. This groove 49 is located in a position facing the outer peripheral end of the lower holder 16 and the clearance 13 (see FIG. 1), and is adapted to separate the elastic support 48, whose shape is maintained by the inward ring 43, from the seal portion of the outward ring 44, so that the stress applied to the seal portion 45 and to the elastic support portion 48 is moderated by the groove 49, whereby the seal portion 45 and the elastic support portion 48 are not influenced by each other.

Next, the operation of this embodiment will be explained. The vibration inputted to the first metallic fitting 1 in the direction of Z, at first, is absorbed by the insulator 3, and the larger vibration is absorbed by the liquid column resonance of the orifice passage 8 and by the elastic deformation of the central thin wall portion 31 of the elastic diaphragm 30 when the hydraulic liquid flows in accordance with the change in volume of the primary liquid chamber 5 due to the deformation of the insulator 3.

When the vibration of still larger amplitude is inputted, the primary liquid chamber 5 is compressed considerably first, and then, when the primary liquid chamber 5 is expanded and restored to its original state with a reversal of the vibration direction, the return of the hydraulic liquid is delayed and the primary liquid chamber 5 turns instantaneously to a negative pressure, so that the hydraulic liquid is partially vaporized so as to cause the cavitation phenomenon. This vibration by babble bursts due to the cavitation phenomenon is transmitted to the partition member 6. However, since the partition member 6 is floatingly supported by the extended portion 12 and the outer peripheral thick wall portion 40, the transmission from the partition member 6 to the outer cylindrical metallic fitting 11 is blocked by the floatingly supporting elastic body, and the noise vibration of the frequency range of the vibration block range after the rigid resonance of the partition member 6 itself is reduced the transmission.

Figure 5:
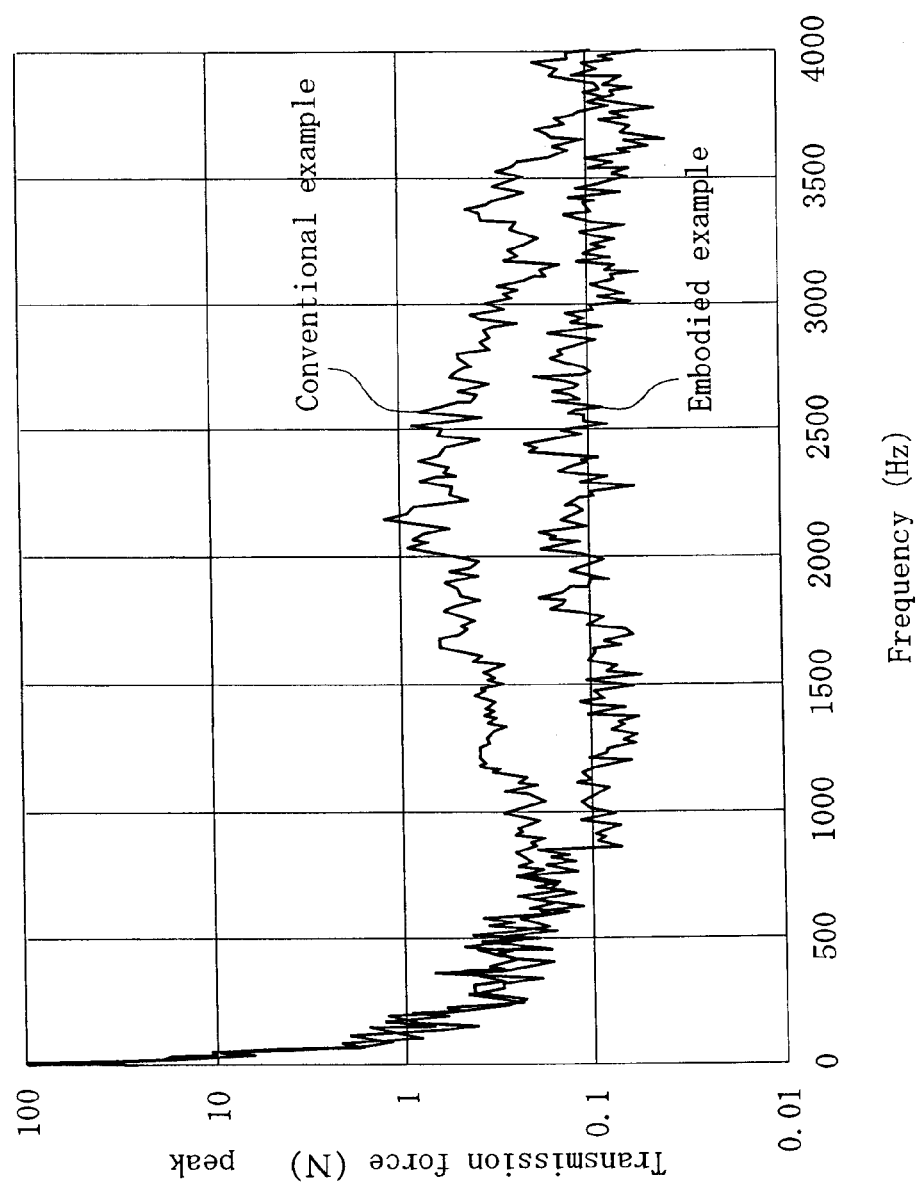
FIG. 5 is a graph showing a vibration transmission characteristic.

FIG. 5 is a graph showing a vibration transmission characteristic, wherein the horizontal axis shows a constitutive frequency (Hz) obtained by frequency-analyzing the transmission vibration, and the vertical axis shows on a logarithmic scale a transmission force (N) that is a magnitude when the vibration is transmitted from the first fitting member 1 to the second fitting member 2. In this example, there are frequency-analyzed the frequency vibrations in the case of exciting at 13 Hz the engine mount according to this embodiment and a conventional one of similar construction without the vibration block structure of the present invention, respectively. There is shown the transmission state of component vibration in a wide frequency range, indicating that the vibration is hard to be transmitted with decreasing in the transmission force. In this graph, there is a remarkable difference in the transmission force between the conventional example having no vibration block structure of the present invention and this embodiment having the vibration block structure, with respect to the vibration component in the frequency range of about 800 Hz~4000 Hz. Since the transmission force in this frequency range is decreased in this embodiment, it is understood that the vibration component in this frequency range is blocked the transmission.

Namely, in the case where an unspecified large number of vibration components comprising for example about 800 Hz~4000 Hz as the noise frequency range of the frequencies due to the cavitation phenomenon are generated, the vibration transmission is blocked if the vibration transmission rate in this frequency range is decreased. Since the graph in FIG. 5 shows the decrease in vibration transmission rate in this frequency range, it is understood that the transmission in the noise frequency range of the vibrations generated due to the cavitation phenomenon is effectively blocked. It is apparent that this vibration transmission blocking is performed by the blocking structure differing from the conventional example, i.e., by the transmission blocking by the extended portion 12 and the outer peripheral thick wall portion 40 of the diaphragm 10 and by the rigid resonance of the partition member 6.

The frequency range that such vibration transmission is blocked is the range of a hammering sound of the elastic diaphragm 30 and of the vibration due to the cavitation phenomenon. Therefore, when these sound and vibration are not transmitted to the outer cylindrical metallic fitting 11, the generation of noises can be prevented. Thus, the shock due to the cavitation phenomenon is not transmitted through the outer cylindrical metallic fitting 11 and the vehicle body side fitting member 2 to the vehicle body side, so that it is not perceived as noises on the vehicle occupant side. Therefore, even if the cavitation phenomenon occurs, it is possible to prevent the generation of uncomfortable noises on the vehicle body side.

Also, since the fixing, to the outer cylindrical metallic fitting 11, of the outer peripheral thick wall portion 40 functioning as the seal portion for the secondary liquid chamber 7 is strengthened, the cavitation phenomenon can be prevented by the floating support. At the same time, it is possible to make sure the seal of the outer peripheral thick wall portion 40. Also, the mounting onto the vehicle body can be made accurately, and the function as the engine mount can be performed assuredly. In addition, since the lower holder 16 is supported by the inward ring 43, the support with respect to the lower holder 16 can be stabilized. Moreover, the assembling operation can be performed easily by arrangement of the clearance 13.

Further, since the outer peripheral thick wall portion 40 of the diaphragm 10 having the seal portion 45 is rigidly fixed to the second metallic fitting 2, the sealing reliability can be improved while preventing the elastic deformation of the seal portion 45, and the proper sealing property can be maintained while blocking the transmission of the vibration by the partition member. Also, the device is made compact with the component parts similar to the conventional one thereby to make the reduction in cost possible. Further, the second metallic fitting is fixedly mounted on the vehicle body side so as to be steadily supported without causing the horizontal movement, etc.

Moreover, the employment of the same structure using the insulator 3 and the diaphragm 10 as the conventional one makes the structure simple and the manufacturing easy without using special members differing from the conventional one. Also, since the whole assembling is completed only by forming the fixing portion 46 by bending the lower end of the outer cylindrical metallic fitting 11, the assembling can be easily done. Further, the fixing of the outer peripheral thick wall portion 40 can be made more reliably and securely by directly contacted connection between the metallic members of the outward ring 44 and the fixing portion 46, so that it is possible to have the liquid sealed vibration isolating device steadily supported on the vehicle body.

Then, although the outward ring 44 is located outside of the partition member 6 and the force is applied in such a manner as to press one end thereof by the fixing portion 46, the other end of the outward ring 44 does not abut on the partition member 6 but simply compresses a little the extended portion 12 located on the outside of the partition member 6, which dose not take part in the floating support. Also, since the elastic support portion 48 of the outer peripheral thick wall portion 40 which takes part in the floating support is not subject to the force from the fixing portion 46 by having the inward ring 43 arranged away from the outward ring 44, the elastic support portion 48 provided with the inward ring 43 and the fixed portion of the outward ring 44 are functionally differentiated so as not to be influenced each other. Then, the existence of the groove 49 serves to promote this functional differentiation. Accordingly, the strong force applied at the time of assembling is not imparted to the partition member 6 thereby making it possible to prevent the fluctuation of the value of spring when in the assembling.

Moreover, although the outward ring 44 functions as the rigid support for the seal portion 45, the seal portion 45 comes in close contact with the inner wall of the outer cylindrical metallic fitting 11 so that even if the large force is applied to the outward ring 44 from the fixing portion 46 at the time of assembling, the seal portion is not elastically deformed by this force, whereby the deformation of the seal portion 45 can be prevented when in the assembling. Also, the outward ring 44 is securely fixed by direct contact between metallic members with the fixing portion 46 thereby making it possible to maintain the proper sealing property. Accordingly, the seal portion 45 which requires the direct fixing of the outward ring 45 and the elastic support portion 48 which has the inward ring 43 not fixed by the fixing portion 46 can be functionally differentiated, so that the fixing operation by the fixing portion 46 is performed easily so as to improve the working efficiency by simplifying the assembling work.

Figure 3:
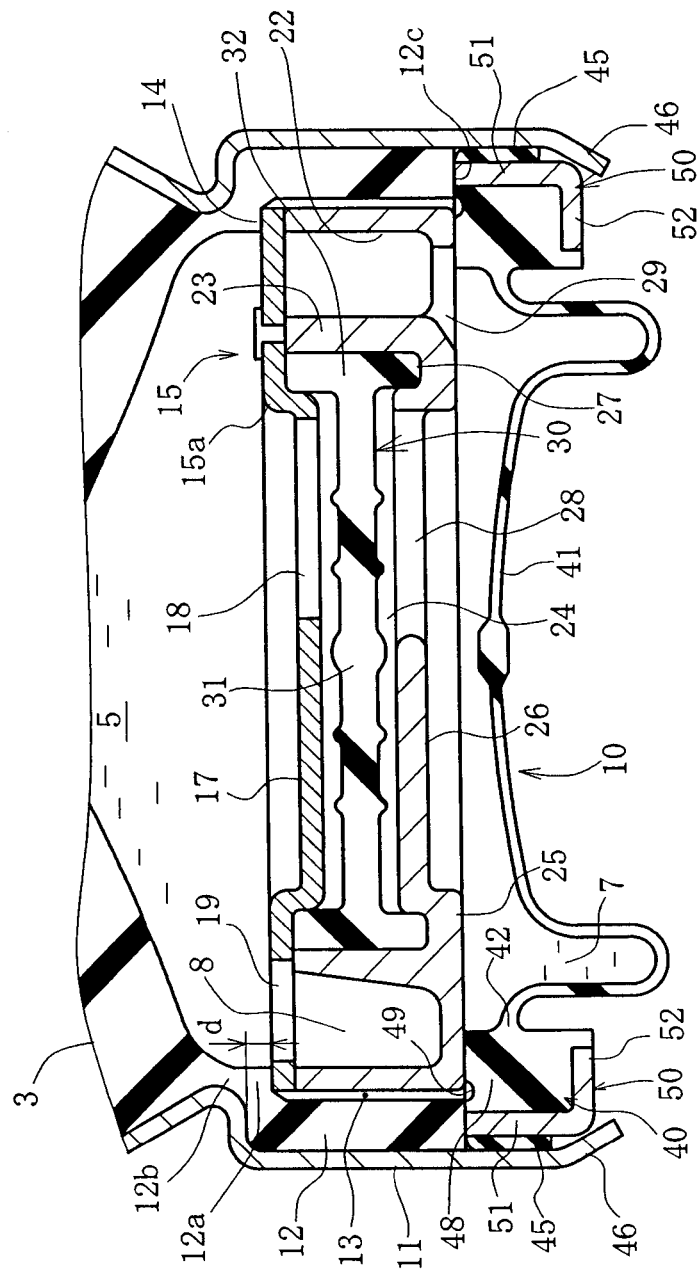
FIG. 3 is a cross sectional view of an essential part of the second embodiment of the present invention.

FIG. 3 concerns the second embodiment and is a cross sectional view on an enlarged scale, similar to FIG. 1, showing the supporting structure of the partition member 6. In this embodiment, only the floating support structure for the partition member 6 is modified a little in comparison with the preceding embodiment. Therefore, the explanation will be focused on this modified structure, and with respect to other structure identical to the preceding embodiment, like parts are given like reference characters and the explanation will be omitted.

In this embodiment, an L-typed ring 50 in the shape of L in cross section is united with the outer peripheral thick wall portion 40. The L-typed ring 50 corresponding to the metallic diaphragm support of the present invention is provided with a vertical wall portion 51 and a bottom portion 52. The vertical wall portion 51 is inserted into the outer peripheral portion of the outer peripheral thick wall portion 40 and is arranged in the similar state to the outward ring 44 of the preceding embodiment. The bottom portion 52 extends from the outer peripheral side to the inner peripheral side of the outer peripheral thick wall portion 40 so as to be united therewith and supports the bottom portion of the outer peripheral thick wall portion 40.

When press-fitting the outer peripheral thick wall portion 40 into inside of the downwardly opened portion of the outer cylindrical metallic fitting 11, having the upper end wall of the vertical wall portion 51 abutted on a lower end wall 12c of the extended portion 12, having the upper end wall of the outer peripheral thick wall portion 40 located inside of the vertical wall portion 51 abutted on the outer peripheral portion of the bottom portion of the lower holder 16, bending the lower end portion of the outer cylindrical metallic fitting 11 inwardly and pressing the fixing portion 46 against an elbow portion between the vertical wall portion 51 and the bottom portion 52, the whole is assembled into a unit.

Then, the bottom portion 52 supports the lower end of the outer peripheral thick wall portion to prevent the outer peripheral thick wall portion 40 from being separated from the lower holder 16 when a heavy load is inputted thereto, whereby it is possible to fix the outer peripheral thick wall portion 40 assuredly. With this structure, it is possible to omit the inward ring 43 of the preceding embodiment, so that the component parts can be decreased in number and the structure can be formed simple.

Figure 4:
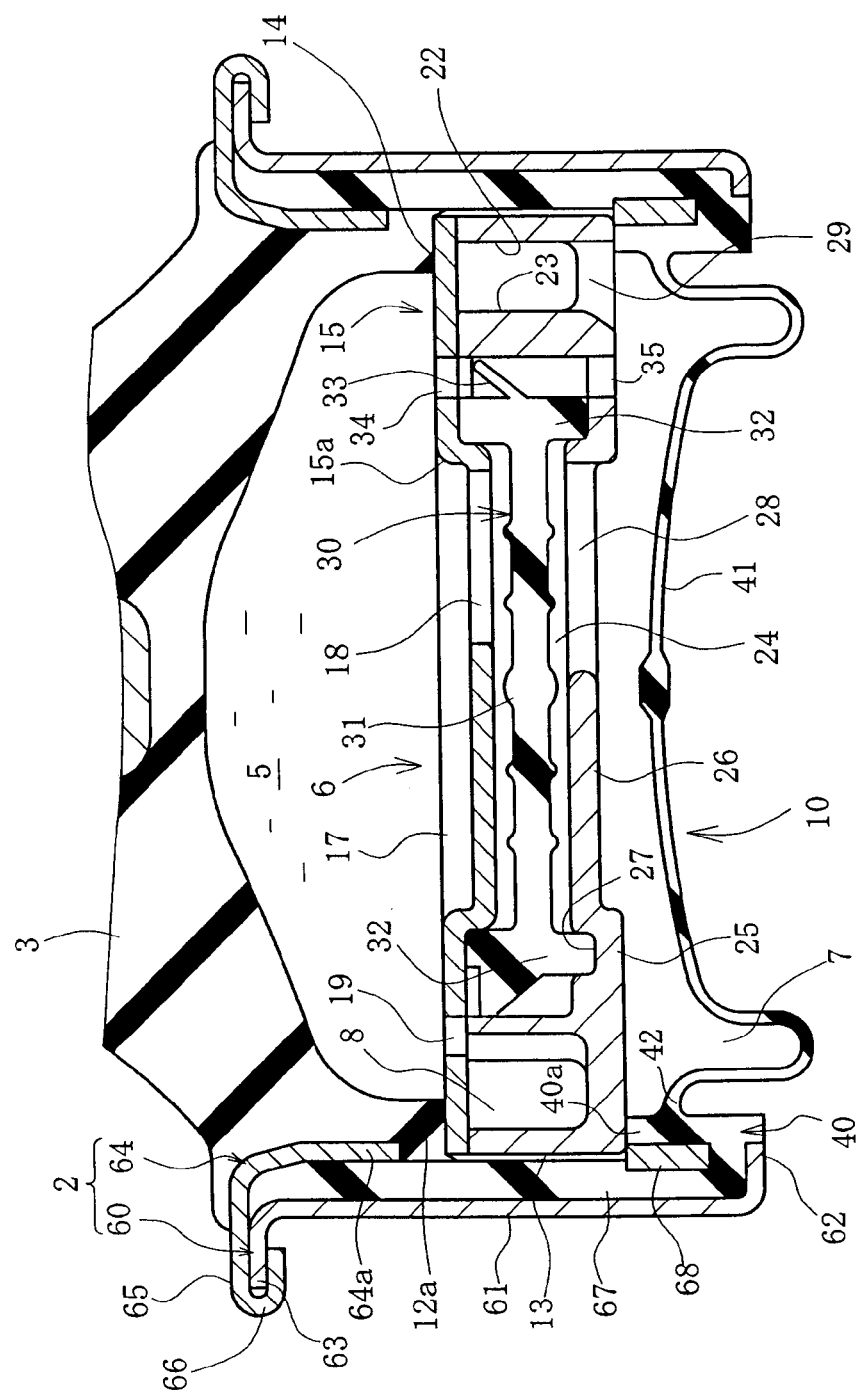
FIG. 4 is a cross sectional view of an essential part of the third embodiment of the present invention.

FIG. 4 concerns the third embodiment and shows a cross sectional view similar to FIG. 3. In this embodiment, there is provided a rigid ring 60 for covering the outside of a metallic connector 64 (corresponding to the outer cylindrical metallic fitting 11 of the previously described embodiment) which is united with the outer cylindrical periphery of the insulator 3. An outer flange 63 formed on the upper end of a vertical wall portion 64 of the rigid ring 60 is overlapped with an outer flange 65 of the cylindrical metallic connector 64 united with the outer periphery of the insulator 3. The tip end of the outer flange 65 is bent substantially in the shape of U such as to be wrapped around the tip end of the outer flange 63 to form a caulked portion 66. The metallic connector 64 and the rigid ring 60 are combined into a unit. The rigid ring 60 corresponds to the one that extends the vertical wall portion 51 of the L-typed ring 50 in the second embodiment, and functions as the metallic diaphragm support of the present invention. The lower portion of the vertical wall portion 61 is united with the outer periphery of the outer peripheral thick wall portion 40, and the lower tip end thereof is bent inwardly to form an inner flange 62. This inner flange 62 is united with and supports the bottom portion of the outer peripheral thick wall portion 40.

On the outer peripheral thick wall portion 40, there is formed an elastic cylindrical portion 67 which is integrally extended along the inner peripheral wall of the vertical wall portion 61 from the main body portion of the outer peripheral thick wall portion for supporting the partition member 6. This elastic cylindrical portion 67 also functions as the elastic support portion in each of the previously described embodiments and is united with the inner peripheral wall of the vertical wall portion 61, while the upper portion of the elastic cylindrical portion 67 is overlapped with the outside wall of a cylindrical portion 64a of the metallic connector 64 so that an area extending from this overlapped portion to the caulked portion 66 forms a final seal portion. The metallic connector 64 corresponds to the outer cylindrical metallic fitting of the previously described embodiments, and the cylindrical portion 64a thereof is rather shortened in comparison with the ones in each of the previously described embodiments, the lower end of which is located above the step 14 so as to form the elastic support portion 12a enough to floatingly support the partition member 6. In this embodiment, the metallic connector 64 and the rigid ring 60 constitute the second metallic fitting 2, and the rigid ring 60 functions both as the support member of the diaphragm 10 and the second metallic fitting 2.

Into the thick wall of the outer peripheral thick wall portion 40 an intermediate ring 68 is inserted for maintaining the shape. The central portion of the upper end wall of the intermediate ring 68 is positioned to face the clearance 13, and the inner peripheral side of the central portion thereof abuts on the outer peripheral portion of the bottom portion 25 of the partition member 6 while the outer peripheral side thereof is bit into the thick wall portion of the elastic cylindrical portion 67. An inside upper portion 40a of the outer peripheral thick wall portion 40 forming an elastic portion located on inner peripheral side of the intermediate ring 68 is so positioned as to adhere to and support the partition member 6 by the caulked fixing between the metallic connector 64 and the rigid ring 60.

In addition, in this embodiment, the elastic diaphragm 30 has a relief valve 33 which is formed integral with the outer peripheral side of the fixing portion 32. The relief valve 33 is integrally formed with the outer peripheral side of the fixing portion 32 and is slanted radially upwardly on the side of the secondary liquid chamber 7 in such a manner that the hydraulic liquid is easy to flow from the secondary liquid chamber 7 to the primary liquid chamber 5. On the side of the primary liquid chamber 5 of the relief valve 33 there is formed a groove which is open to the primary liquid chamber 5. The relief valve 33, when the primary liquid chamber 5 becomes negative pressure, is adapted to leak the hydraulic liquid from the secondary liquid chamber 7 to the primary liquid chamber 5 through leak holes 34 and 35 which are formed in each outer peripheral portion of the upper plate 15 and the lower holder 16 and inside of the arc-shaped groove 22, so that the occurrence of the cavitation phenomenon itself is prevented by canceling the negative pressure.

When assembling this engine mount, the partition member 6 is fitted inside and fixed in position by the step 14. The partition member 6 is fitted into the sub-assembled body that the diaphragm 10 and the elastic cylindrical portion 67 formed continuously integral therewith are united with the rigid ring 60. The outer periphery of the bottom portion 25 of the lower holder 16 is placed on the inside upper portion 40a. The sub-assembling body that the metallic connector 64 and the insulator 3 are united is put on it. Then, the outer flanges 63 and 65 are overlapped and caulked together so as to be united by directly contacted relationship between these metallic members in the caulked portion 66, whereby the whole assembling is completed.

With this structure, since the intermediate ring 68 is in contact between rigid members with the bottom portion of the lower holder 16 and the bottom portion of the elastic support portion 48 is supported by the inner flange 62, it is possible to maintain the adhesion and support of the partition member 6 by the inside upper portion 40a. Also, since the intermediate ring 68 is separated from the side of the rigid ring 60 such as the inner flange 62, etc. by the elastic support portion 48 and the elastic cylindrical portion 67, the intermediate ring 68 functions only to maintain the shape of the outer peripheral thick wall portion 40, so that the partition member 6 can be floatingly supported by the outer peripheral thick wall portion 40 of the diaphragm 10 in the same manner as above.

Also, since the caulked fixing between the metallic connector 64 and the rigid ring 60 is performed in such a state as to be precisely positioned on the outside of the insulator 3 and then, the heavy force is not applied to the inner flange 62 and the intermediate ring 68, the elastic support portion 12a and the inside upper portion 40a which function as a spring portion for floatingly supporting the partition member 6 are not compressed too much so as to make it possible to maintain the predetermine value of spring. Therefore, the fluctuation of the value of spring at the time of assembling is prevented thereby to allow the partition member 6 to generate the predetermined rigid resonance, so that the noises due to the cavitation phenomenon can be effectively restrained in cooperation with the relief structure.

Further, the adhered walls between the elastic cylindrical portion 67 and the cylindrical portion 64a of the metallic connector 64 constituting the final seal portion are located far remote from the elastic support portion 12a and the elastic cylindrical portion 67 constituting the floating support portion. The elastic support portion side and the seal portion side are also separated by the intermediate ring 68. Moreover, the force by caulking when in assembling does not reach the seal portion so as not to be elastically deformed. Accordingly, it is possible to maintain the proper sealing property throughout before and after the assembling. Also, since the vertical wall portion 61 covers the outside of the seal portion, the deformation of the seal portion can be prevented.

Figure 6:
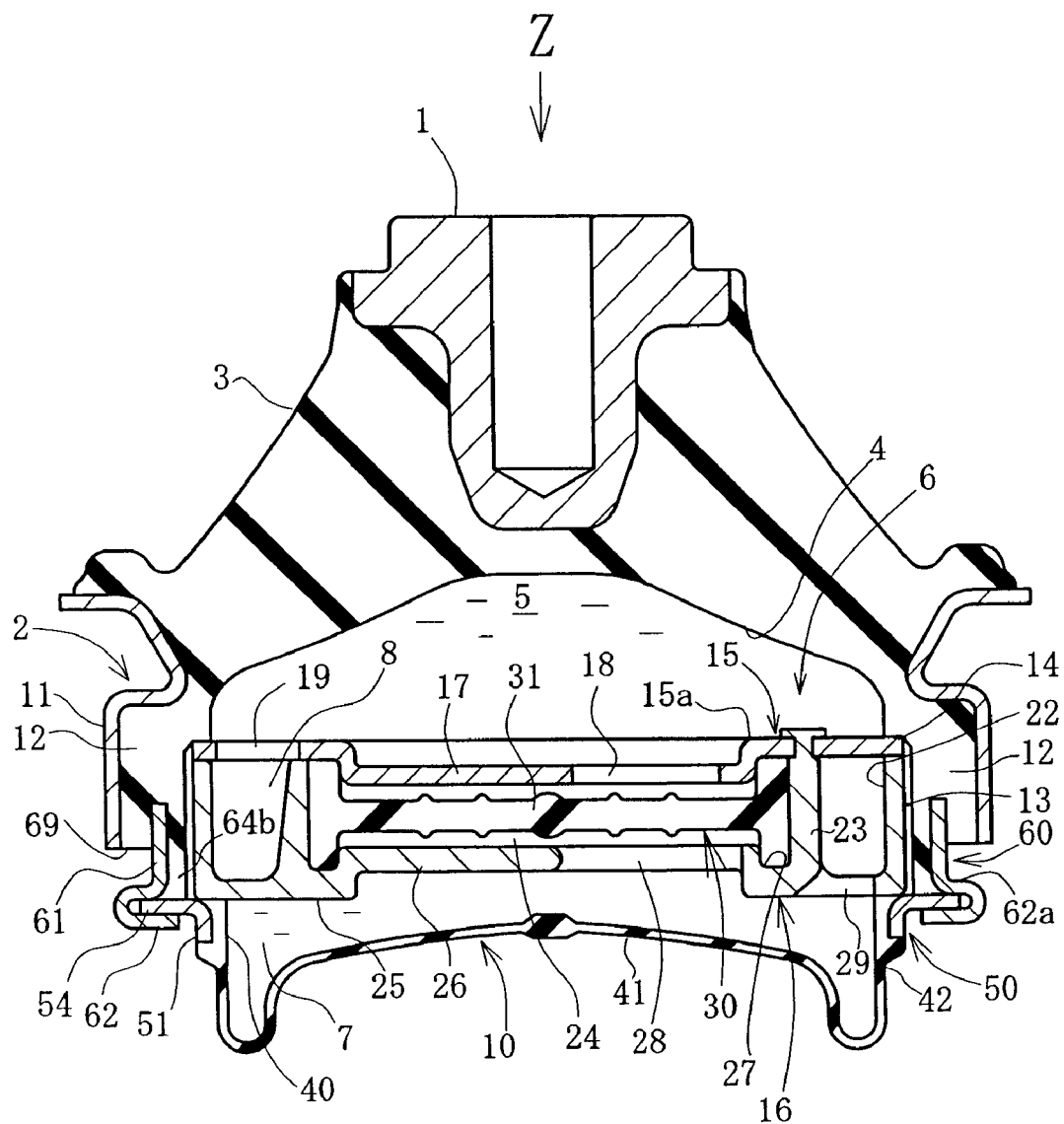
FIG. 6 is a vertical cross sectional view of an engine mount according to the fourth embodiment of the present invention.
Figure 7:
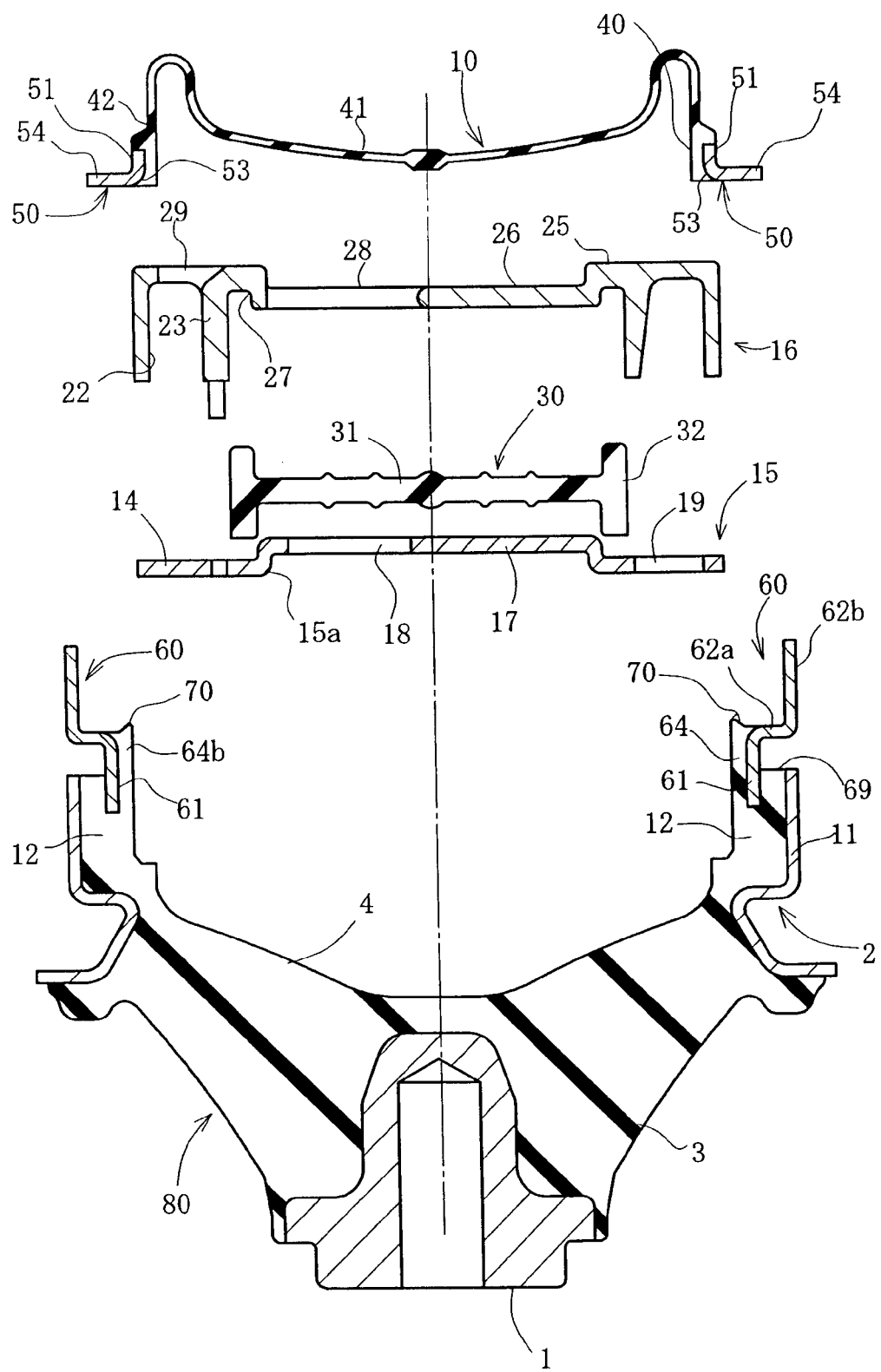
FIG. 7 is an exploded view of the engine mount shown in FIG. 6.

FIGS. 6 and 7 concern the fourth embodiment of the present invention, wherein FIG. 6 is a longitudinal cross section of an engine mount, and FIG. 7 is an exploded view of each of components. FIG. 6 also is a cross section cut in the inputting direction Z of principal vibration. In this embodiment, with respect to the structure identical to the previously explained embodiments, like or corresponding parts are given like reference characters and the explanation will be partially omitted. Also, in the following explanation, each of directions such as up and down, right and left, or the like is expressed based on an illustrated state in FIG. 6.

Referring now to FIGS. 6 and 7, an outer periphery of the bottom portion 25 of the lower holder 16 is supported by an outer peripheral portion of the diaphragm 10. The outer peripheral portion of the diaphragm 10 is comprised of an outer peripheral thick wall portion 40 and a fitting ring 50. The outer peripheral thick wall portion 40 is a comparatively rigid annular wall which surrounds an outer periphery of a thin main body portion 41 functioning as the diaphragm 10 and is integrally formed with the main body portion 41. The outer peripheral thick wall portion 40 varies in thickness from the main body portion and a connecting portion 42 and, in this embodiment, is 2~3 times as thick as the ordinary thickness of the main body portion 41. The thickness of the main body portion 41 is at such a level that the value of spring thereof hardly produces a significant numerical value.

The fitting ring 50 which is a substantially L-shaped cross sectional metallic fitting is united with the outer peripheral side of the outer peripheral thick wall portion 40 by insert molding or the like. An inside cylindrical portion 51 is united with the outer peripheral side of the outer peripheral thick wall portion 40 and has an outer peripheral wall thereof exposed. An upper end portion of the cylindrical portion 51 is turned outwardly to form an outer flange 54 and extends outwardly of the outer peripheral thick wall portion 40. The thickness of the outer peripheral thick wall portion 40 is set to be about twice as thick as the cylindrical portion 51 (a portion thereof overlapped with the cylindrical portion 51 in the radial direction is level with the cylindrical portion 51). The outer flange 54 is extended up to an outer position in the vicinity of the extended portion of the outer cylindrical metallic fitting 11. A bent portion 53 between the cylindrical portion 51 and the outer flange 54 of the fitting ring 50 and the upper end wall of the outer peripheral thick wall portion 40 are in contact with the outer periphery of the lower holder 16.

A vertical wall portion 61 of the rigid ring 60 is inserted in and united with the extended portion 12. A lower portion of the vertical wall 61 is extended downwardly from the extended portion 12 to form a inner flange 62 of a substantially U-shaped cross section so as to be united with the outer flange 54 in the directly contacted relationship between metals. On an outer peripheral portion of the lower portion of the extended portion 12 there is formed a cutout portion 69 exposing an outer peripheral wall of the lower side of the vertical wall portion 61, so that the caulking operation of the caulked portion 66 can be carried out by having a tool fitted to the cutout portion.

On the lower portion of the extended portion 12 forming the cutout portion 69 there is formed an inner peripheral portion 64b, which is left without being cut out, located on the inner peripheral side of the ring portion 61. A lower end of the inner peripheral portion extends downward up to the level of the bottom portion of the lower holder 16. A seal lip 70 (see FIG. 7) formed on a lower end wall of the inner peripheral portion adheres to the surface of the outer flange 54 to form a seal such that the surface of the outer flange 54 functions as a seal surface.

The extended portion 12 between the outer cylindrical metallic fitting 11 and the clearance 13 is about 4 to 5 times as thick as the wall portion 61. The inner peripheral portion 64 inside of the ring portion 61 is about 1 to 1.5 times as thick as the wall portion 61, while the portion located on the outer peripheral side of the wall portion 61 is about 2 to 2.5 times as thick as the wall portion 61.

When caulking and fixing between the outer flange 54 of the L-typed ring 50 and the inner flange 62 of the rigid ring 60 in the outward position of the partition member 6, the partition member 6 and the diaphragm 10 are floatingly supported through the rigid ring 60 on the extended portion 12 of the insulator 3. Thus constituted support spring by the extended portion 12 forms a proper spring that supports by the shear deformation with respect to upward and downward movement of the rigid ring 60. Then, since the thickness of the extended portion 12 between the outer cylindrical metallic fitting 11 and the rigid ring 60 is large enough, the proper spring due to the sear deformation can be formed.

In addition, the upper end of the outer peripheral portion of the partition member 6 is supported by the compression deformation of the step 14 of the extended portion 12, whereby the partition member 6 is floatingly supported by the extended portion 12 of the insulator 3. Accordingly, the partition member 6 and the diaphragm 10 are rigidly resonated at a natural frequency that is determined by the spring of the extended portion and the mass of the vibration constituent. In a higher frequency range (concretely, a frequency range exceeding substantially the square root of 2 times of a natural value frequency constituting a peak frequency of the rigid resonance) after this rigid resonance, the vibration of rigid body decreases with increasing in frequency. Therefore, the vibration of the rigid body due to the vibration generated in the liquid chamber decreases so as to have the transmission of vibration from the rigid body to the outside decreased.

Namely, since the higher vibration than the frequency of the rigid resonance is blocked the transmission by the rigid resonance, this frequency range is referred to as the vibration block range. However, the term "block" in the present invention is not used in the strict sense of the word but includes "decrease", so that "vibration block range" means the range decreasing the transmission vibration in comparison with the inputted vibration and means the frequency range not only that the transmission is blocked but also that the transmission is decreased.

Accordingly, when the noise frequency range is controlled to be superimposed over the vibration block range, the vibration of noises generated in the primary liquid chamber 5 can be blocked the transmission from the partition member 6 of rigid body through the outer cylindrical metallic fitting 11 to the vehicle body side. Concretely, the tuning is performed such that the peak frequency of rigid resonance is caused at a lower frequency than the noise frequency range.

In this embodiment, the noise frequency range is set to correspond to the frequency range of vibration due to the cavitation phenomenon occurred in the primary liquid chamber 5, and the tuning is performed such that the frequency lower than this frequency range is at a peak of rigid resonance, whereby the vibration block range is superimposed over the noise frequency range. Concretely, although the frequency range of vibration itself generated due to the cavitation phenomenon is wide and difficult to be identified, given that it is 800~4000 Hz, it is possible to superimpose the vibration block range over the frequency range of vibration due to the cavitation phenomenon by setting the peak frequency of rigid resonance at about 600 Hz.

When being tuned in the above mentioned manner, the frequency of the vibration block range of the frequencies due to the cavitation phenomenon occurred in the primary liquid chamber 5 is blocked the transmission of vibration from the partition member 6 to the outer cylindrical metallic fitting 11. Therefore, since this vibration is blocked the transmission to the vehicle body side even if the cavitation phenomenon is occurred in the primary liquid chamber 5, the noise is not perceivable on the vehicle body side. Therefore, the noise due to the cavitation phenomenon is hardly sensed in a bodily sensation, so that the noise due to the cavitation phenomenon may be neglected. Also, since the vibration of the partition member 6 is restrained in the vibration block range, and besides, the value of spring of the support springs for floatingly supporting the partition member 6 is greater by far than the value of spring of the central thin wall portion 31, the decline in damping is stopped while preventing the internal pressure from being decreased beyond necessity.

The mass in the vibration system performing this rigid resonance is constituted by the partition member 6 and, in addition thereto, by mass comprising the hydraulic liquid of the secondary liquid chamber 7, the diaphragm 10, L-typed ring 50 and the rigid ring 60. As the result, if the value of spring for floating support is constant, the resonance frequency is decreased with increasing in the mass. For example, the resonance frequency becomes 570 Hz and the blocking range becomes about 800 Hz~4000 Hz. Also, when connecting the rigid ring 60 floatingly supported on the outer cylindrical metallic fitting 11 with the L-typed ring 50 so as to floatingly support the secondary liquid chamber 7 including the diaphragm 10, the mass of the hydraulic liquid of the secondary liquid chamber 7 can be easily added to the mass of the vibration system. Moreover, given that the resonance frequency of the rigid resonance is constant, the value of spring can be increased by increasing the mass of the vibration system and the high damping can be materialized by this increase in the value of spring. Then, since the value of spring of the vibration system is defined due to the shear deformation of the extended portion 12, the setting of the value of spring becomes easy to be performed by decreasing the spring of value, etc.

In the case of assembling this engine mount, as shown in FIG. 7, at first, the sub-assembled body that the first metallic fitting 1, the outer cylindrical metallic fitting 11, the insulator 3 and the rigid ring 60 are united together is made and turned upside down from the state in FIG. 6. Herein, the extended portion of the rigid ring 60 is in a bent form comprising a substantially horizontal step portion 62a and a tip end portion 62b bent substantially at a right angle and extending upward in this drawing. Then, the partition member 6 is fitted into the inside of the extended portion 12 so as to be positioned by the step 14. Next, the outer peripheral thick wall portion 40 of the diaphragm 10 and the bent portion 53 of the fitting ring 50 are contacted with the outer periphery of the bottom portion 25 of the partition member 6. Thereafter, the outer flange 54 of the fitting ring 50 is placed on the step portion 62a of the metallic connector 60. Then, the tip of the tip end portion 62b is folded inwardly while crashing the seal lip 65 to be adhered to the outer flange 54, thereby forming the inner flange 62 (FIG. 1). By being caulked and fixed here, the whole is assembled into a unit and the final seal is formed between the lower end of the inner periphery portion 64b of the extended portion 12 and the outer flange 54.

In this way, when simply placing each of component parts one upon another in order and caulking the L-typed ring 50 and the rigid ring 60, the whole can be united and easily assembled.

Next, the operation of this embodiment will be explained. The vibration inputted to the first metallic fitting 1 in the direction of Z is absorbed at first by the insulator 3, and the larger vibration is absorbed by the liquid column resonance of the orifice passage 8 and by the elastic deformation of the central thin wall portion 31 of the elastic diaphragm 30 when the hydraulic liquid flows in accordance with the change in volume of the primary liquid chamber 5 due to the deformation of the insulator 3.

When the vibration of still larger amplitude is inputted, the primary liquid chamber 5 is compressed considerably first, and then, when the primary liquid chamber 5 is expanded and restored to its original state with a reversal of the vibration direction, the return of the hydraulic liquid is delayed and then the primary liquid chamber 5 turns instantaneously to a negative pressure, so that air in the hydraulic liquid is vaporized so as to develop the cavitation phenomenon. This vibration by babble bursts due to the cavitation phenomenon is transmitted to the partition member 6.

Then, the partition member 6 and the diaphragm 10 are rigidly resonated in a body at the frequency that corresponds to the vibration which is determined by the spring of the extended portion and the mass of the vibration constituent and which is generated by the cavitation phenomenon, and thereafter decrease the vibration in the blocking range. Moreover, the partition member 6 and the diaphragm 10 are floatingly supported by the extended portion 12 so that the existence of the extended portion 12 itself serves to decrease the transmission of vibration to the outer cylindrical metallic fitting 11.

The vibration transmitting characteristics of this embodiment is as same as a drawing of FIG. 5.

In this way, the shock due to the cavitation phenomenon is not transmitted through the vehicle body side fitting member 2 including the outer cylindrical metallic fitting 11 to the vehicle body side, so that it is not perceived as the noise on the vehicle occupant side. Therefore, even if the cavitation phenomenon occurs, it is possible to prevent the generation of uncomfortable noises on the vehicle body side. Moreover, different from the prior art that the whole of the device is floatingly supported, the floating support of only the partition member 6 and the diaphragm 10 is required, and only the comparatively small modification in the structure such as the metallic connector, etc. is required, whereby it is possible to make the device compact and to save the cost. Also, since the second metallic fitting 2 including the outer cylindrical metallic fitting 11 is fixedly mounted on the vehicle body side so as not to develop the lateral movement, etc., the stable support can be performed.

Further, since the extended portion 12 of the insulator 3 is adapted to support in the direction of shear the rigid ring 60 which is a connecting element with the L-typed ring 50 integrally formed with the outer peripheral thick wall portion 10 of the diaphragm, the partition member 6 is easy to be vibrated and the value of spring of the floating support portion can be widely varied, so as to enable the degree of freedom of the tuning to be increased.

In addition, since the clearance is provided between the outer peripheral portion of the partition member 6 and the inner peripheral portion 64b which is the elastic body located around the outer peripheral portion, the partition member 6 is easy to be vibrated due to this clearance 13 so as to enable the rigid resonance of the partition member 6 to be reliably performed. Also, since the mass comprising the hydraulic liquid of the secondary liquid chamber 7, the L-typed ring 50 functioning as the connecting member, the rigid ring 60 and the diaphragm 10 is added to the mass of the rigid resonance, it is possible to decrease the frequency of the rigid resonance by the increase of the mass thereby enabling the adjustment of the rigid resonance to be easily performed.

Moreover, since the rigid ring 60 supported by the deformation in the direction of shear is integrally provided on the extended portion 12 and the inner flange 62 of a portion of the rigid ring 60 is combined by caulking with the outer flange, which is a portion of the L-typed ring 50 united with the outer peripheral thick wall portion 40 of the diaphragm 10, in the directly contacted relationship between metals in the position outwardly away from the outer peripheral portion of the partition member 6 and the outer peripheral thick wall portion 40, the outer peripheral thick wall portion 40 of the diaphragm 10 which floatingly supports the partition member 6 is not compressed by far due to this combination by caulking, so that since the value of spring is not varied, it is possible to prevent the change in performance when in assembling.

Also, since the outer flange 54 of the L-typed ring 50 is projected outwardly from the outer peripheral portion of the diaphragm 10 and is combined by caulking with the inner flange 62 of the rigid ring 60 in the directly contacted relationship between metals, and since the surface of the outer flange 54 forms the seal surface to which the lower end portion of the inner peripheral portion 64b of elastic body located around the partition member 6 adheres, it is possible to make the seal surface stable and to maintain the proper sealing performance. Therefore, since the adhesion between the lower end portion of the inner peripheral portion 64b of the extended portion 12 and the outer flange 54 of the L-typed ring 50 which constitute the final seal portion for the liquid chamber can be reliably maintained, the cavitation phenomenon can be prevented by the floating support of the partition member 6 and at the same time the sealing of the final seal portion can be reliably performed, so that it is possible to have the mount function accurately exerted.

Further, since the L-typed ring is formed in an L-shaped cross section and is provided with the vertical wall portion 51 and the outer flange 54, the vertical wall portion 51 can support in a state of a ring the outer peripheral thick wall portion 40 of the diaphragm 10. Also, since the bent portion 53 between the vertical wall portion 51 and the outer flange 54 supports the partition member 6 in abutment thereon and the outer flange 54 forms the combined portion between the seal portion and the metallic connector, the seal portion and the connection fixing portion can be formed by a single member and it is possible to reinforce the seal portion and the outer peripheral thick wall portion 40 of the diaphragm 10 at the same time. In addition, since the bent portion 53 is formed in a curved shape to abut on the partition member 6 by a curved surface, the excessive fastening can also be avoided by precisely adjusting the abutment position at the time of fixing.

While the invention has been described in the preferred embodiments, it is to be understood that the present invention is not limited to each of the above described embodiments, and that modifications and applications may be variously made within the scope and spirit of the invention. For example, the present invention may be applied to various kinds of items such a suspension mount, etc. besides the engine mount. Further, noises to be prevented are not limited to the ones created due to the cavitation phenomenon but include various kinds of sounds and vibrations such as hammering sounds of the elastic diaphragm 30, etc. generated within the primary liquid chamber if in the frequency band of the predetermined range.

What is claimed is:

1. A liquid sealed vibration isolating device comprising a first metallic fitting to be mounted on one of mounting counterparts, a second cylindrical metallic fitting to be mounted on the other of the mounting counterparts, an insulator for connecting in a vibration isolating state between said first and second metallic fittings, a primary liquid chamber using said insulator as a portion of the wall thereof and being filled with a hydraulic liquid, a secondary liquid chamber being partitioned from said primary liquid chamber by a partition member and having at least a portion of a wall formed by a diaphragm, an orifice passage being formed in said partition member to communicate between said primary liquid chamber and said secondary liquid chamber, and a portion of said second metallic fitting forming an outer metallic cylinder which is united with the periphery of said insulator, wherein said partition member is floatingly supported between said insulator and an outer peripheral thick wall portion of said diaphragm while an elastic body is interposed between said second metallic fitting and said partition member, so as to block the transmission of vibration from said partition member to said second metallic fitting, said outer peripheral thick wall portion of said diaphragm is provided with a rigid metallic diaphragm support that separates the outer peripheral thick wall portion into an elastic supporting portion for floatingly supporting said partition member and a seal portion that is in direct contact with an inner wall of the second cylindrical metallic fitting, said metallic diaphragm support is fixed by said second metallic fitting in a directly contacted relationship between said metallic diaphragm support and said second metallic fitting and arranged away from said partition member, and said elastic support portion is located inside of said metallic diaphragm support to floatingly support said partition member.

2. The liquid sealed vibration isolating device according to claim 1, wherein a clearance is provided between an outer peripheral portion of said partition member and an elastic body located around the outer peripheral portion.

3. The liquid sealed vibration isolating device according to claim 1, wherein said metallic diaphragm support is formed by a substantially L-shaped member in cross section which is united with a peripheral portion and a bottom portion of said outer peripheral thick wall portion.

4. The liquid sealed vibration isolating device according to claim 3, wherein said second metallic fitting comprises a metallic connector being united with the peripheral portion of said insulator and an extended portion being extended from a portion of said metallic diaphragm support, said outer peripheral thick wall portion being integrally provided with a main body portion for supporting said partition member and an elastic cylindrical portion being extended continuously from the main body portion to a lateral side of said metallic connector, said elastic cylindrical portion is fitted on an outside of said metallic connector to form a seal portion between an inside wall of said elastic cylindrical portion and an outer wall of said metallic connector, a portion of said metallic diaphragm support is extended to cover an outside of said elastic cylindrical portion and to form said extended portion, and a tip end of said extended portion is bent outwardly and overlapped with a portion of said metallic connector which is projected laterally from said insulator, so as to be fixedly combined by direct contact between said extended portion and said metallic connector.

5. The liquid sealed vibration isolating device according to claim 1, wherein a clearance is provided between an outer peripheral portion of said partition member and an elastic body located around the outer peripheral portion.

6. A liquid sealed vibration isolating device comprising a first metallic fitting to be mounted on one of mounting counterparts, a second cylindrical metallic fitting to be mounted on the other of the mounting counterparts, an insulator for connecting in a vibration isolating state between said first and second metallic fittings, a primary liquid chamber using said insulator as a portion of the wall thereof and being filled with a hydraulic liquid, a secondary liquid chamber being partitioned from said primary liquid chamber by a partition member and having at least a portion of a wall formed by a diaphragm, an orifice passage being formed in said partition member to communicate between said primary liquid chamber and said secondary liquid chamber, and a portion of said second metallic fitting forming an outer metallic cylinder which is united with the periphery of said insulator, wherein said partition member is floatingly supported between said insulator and an outer peripheral thick wall portion of said diaphragm while an elastic body is interposed between said second metallic fitting and said partition member, so as to block the transmission of vibration from said partition member to said second metallic fitting, said outer peripheral thick wall portion of said diaphragm is provided with a rigid metallic diaphragm support united therewith and an elastic supporting portion for floatingly supporting said partition member, said metallic diaphragm support is fixed by said second metallic fitting in a directly contacted relationship between said metallic diaphragm support and said second metallic fitting and arranged away from said partition member, and said elastic support portion is located inside of said metallic diaphragm support to floatingly support said partition member, wherein said metallic diaphragm support comprises a rigid ring which separates said outer peripheral thick wall portion of said diaphragm into said elastic support portion on the inside and a seal portion on the outside.

7. The liquid sealed vibration isolating device according to claim 6, wherein dual rings which are spaced apart inwardly and outwardly are united with said outer peripheral thick wall portion, and the inward ring is located in said elastic support portion to support said partition member, and the outward ring forms said metallic diaphragm support.

8. The liquid sealed vibration isolating device according to claim 7, wherein a clearance is provided between an outer peripheral portion of said partition member and an elastic body located around the outer peripheral portion.

9. The liquid sealed vibration isolating device according to claim 6, wherein said metallic diaphragm support is formed by a substantially L-shaped member in cross section which is united with a peripheral portion and a bottom portion of said outer peripheral thick wall portion.

10. The liquid sealed vibration isolating device according to claim 9, wherein said second metallic fitting comprises a metallic connector being united with the peripheral portion of said insulator and an extended portion being extended from a portion of said metallic diaphragm support, said outer peripheral thick wall portion being integrally provided with a main body portion for supporting said partition member and an elastic cylindrical portion being extended continuously from the main body portion to a lateral side of said metallic connector, said elastic cylindrical portion is fitted on an outside of said metallic connector to form a seal portion between an inside wall of said elastic cylindrical portion and an outer wall of said metallic connector, a portion of said metallic diaphragm support is extended to cover an outside of said elastic cylindrical portion and to form said extended portion, and a tip end of said extended portion is bent outwardly and overlapped with a portion of said metallic connector which is projected laterally from said insulator, so as to be fixedly combined by direct contact between said extended portion and said metallic connector.

11. The liquid sealed vibration isolating device according to claim 10, wherein a clearance is provided between an outer peripheral portion of said partition member and an elastic body located around the outer peripheral portion.

12. The liquid sealed vibration isolating device according to claim 9, wherein a clearance is provided between an outer peripheral portion of said partition member and an elastic body located around the outer peripheral portion.

13. The liquid sealed vibration isolating device according to claim 6, wherein a clearance is provided between an outer peripheral portion of said partition member and an elastic body located around the outer peripheral portion.

14. A liquid sealed vibration isolating device comprising a first metallic fitting to be mounted on one of mounting counterparts, a second cylindrical metallic fitting to be mounted on the other of the mounting counterparts, an insulator for connecting in a vibration isolating state between said first and second metallic fittings, a primary liquid chamber using said insulator as a part of a wall thereof and being filled with a hydraulic liquid, a secondary liquid chamber being partitioned from said primary liquid chamber by a partition member and having at least a portion of a wall formed by a diaphragm, an orifice passage being formed in said partition member to communicate between said primary liquid chamber and said secondary liquid chamber, and said partition member being held between said insulator and an outer peripheral portion of said diaphragm,
wherein said insulator is connected to said outer peripheral portion of said diaphragm while the connected portion between said insulator and said diaphragm is supported by deformation in the direction of shear of said insulator, so as to floatingly support said partition member such that said partition member rigidly resonates;
wherein said insulator is integrally provided with a metallic connector which is supported by the deformation in the direction of shear of said insulator, a portion of said metallic connector is extended from said insulator, and a portion of a metallic fitting ring which is united with said outer peripheral portion of said diaphragm is extended, wherein said extended portions of said metallic connector and of said fitting ring each are combined in a directly contacted relationship between said extended portions of said metallic connector and of said fitting ring in a position outwardly away from said outer peripheral portion.

15. The liquid sealed vibration isolating device according to claim 14, wherein said fitting ring is projected outwardly of said outer peripheral portion of said diaphragm to be combined with said metallic connector in the directly contacted relationship between metals and to form a seal surface to which an elastic body located around said partition member adheres.

16. The liquid sealed vibration isolating device according to claim 15, wherein said fitting ring is provided with a ring portion of a substantially L-shaped cross section and a flange portion, said ring portion is adapted to support in a state of a ring shape said outer peripheral portion of said diaphragm while said flange portion abuts on and supports said partition member and is projected outwardly of said outer peripheral portion of said diaphragm to be combined with said metallic connector.

17. The liquid sealed vibration isolating device according to claim 14, wherein a clearance is provided between said outer peripheral portion of said partition member and said insulator located around said outer peripheral portion.

18. The liquid sealed vibration isolating device according to claim 14, wherein, in a vibration system comprising mass of said partition member and springs of said insulator and said outer peripheral portion of said diaphragm for floatingly supporting said partition member, mass comprising the hydraulic liquid in said secondary liquid chamber and said fitting ring is added to the mass of said partition member.

* * * * *